United States Patent [19]
Frattarola

[11] Patent Number: 5,897,278
[45] Date of Patent: Apr. 27, 1999

[54] TURN FASTENER

[75] Inventor: Albert J. Frattarola, Swarthmore, Pa.

[73] Assignee: Southco, Inc., Concordville, Pa.

[21] Appl. No.: 09/019,512

[22] Filed: Feb. 5, 1998

[51] Int. Cl.[6] .................................................. F16B 21/00
[52] U.S. Cl. ........................ 411/549; 411/350; 411/508
[58] Field of Search ................................. 411/349, 350, 411/549–553, 508–510

[56] References Cited

U.S. PATENT DOCUMENTS

| 2,281,443 | 4/1942 | Jones | 411/550 |
| 2,327,327 | 8/1943 | Maynard | 411/550 |
| 3,362,672 | 1/1968 | Wigam | 411/549 |
| 4,652,192 | 3/1987 | Schaller | 411/549 |
| 4,978,265 | 12/1990 | De Wan | 411/510 |

FOREIGN PATENT DOCUMENTS

| 2236141 | 3/1991 | United Kingdom | 411/553 |

OTHER PUBLICATIONS

Simmons Fastener Corp. cataog No. 760, pp. 18–24, Jan. 1962.

*Primary Examiner*—Flemming Saether
*Attorney, Agent, or Firm*—Paul & Paul

[57] ABSTRACT

A fastener member having a head and a body portion with a plurality of arm members flexibly provided to compress a first member against a second member against the force of the fastener head to fasten the first and second members. The fastener member can secure articles or panels of different thicknesses as well as those of non-uniform thickness to other members or articles. A receiving socket is also provided to be used in conjunction with the fastener member.

15 Claims, 9 Drawing Sheets

TURN FASTENER

BACKGROUND OF THE INVENTION

1. Field of the Invention

The present invention relates to the field of fasteners, and more particularly to one-piece turn fasteners.

2. Brief Description of the Prior Art

A variety of fasteners are utilized to secure one panel to another panel or member. Many fastening devices comprise complex organizations of parts or elements which must be assembled in order to construct the fastener. A need exists for a simple fastening apparatus which can be easily constructed and readily able to install on a surface.

One-piece fasteners have been known in the field of latches. Among one-piece fasteners are draw latches, which include a member which is drawn over a stop or receiving member to secure the latch. For example, the one-piece member is attached to one panel or closure member and the receiving member is generally mounted to a second panel. This type of latch usually requires the stretching of the latch to engage the stop or retaining member. An example of a draw latch is shown in U.S. Pat. No. D333,775. Other latches, such as the "Door or Panel Fastener" disclosed in U.S. Pat. No. 4,763,935 to Robert H. Bisbing, provide rotary operation of a pawl between latched and unlatched positions. Another latch which includes rotation of a pawl to fasten a first panel to a second panel is shown in U.S. Pat. No. 4,556,244 issued to Robert H. Bisbing for a "Latch Assembly Having Pull-up Action".

SUMMARY OF THE INVENTION

The present invention provides a novel fastening apparatus which can be used to secure two members, such as first and second panels, together. The fastening apparatus can include a member with a head and a body portion extending therefrom. The fastener member is installed by inserting it through an aperture in a first member or panel and then through an aperture or cut-out portion of a second member panel which is to be secured to the first panel. The aperture provided in the first panel accommodates receipt of a portion of the fastener member while preventing the head of the member from passing through the first panel. The novel fastening apparatus of the present invention has a compression portion which acts upon a second member or panel to maintain it in secured relation with another member, such as a first panel. Preferably the compression is provided through a spring biasing member.

The fastening member of the present invention can have a plurality of compression members to offer variable compression for accommodating one or more panels of varying thicknesses.

Another object of the present invention is to provide a novel fastening member and a keeper member, where the keeper member may comprise the second panel itself, or may ultimately be provided as a receptacle which is installed on a second panel.

Another object of the present invention is to provide, on the second panel, a receiving area for the compression member.

It is a further object of the present invention to provide a novel fastener which can comprise one-piece construction.

It is another object of the present invention to provide a novel fastening member which can be installed on one or more panels through insertion into an aperture or cut-out in each panel.

It is another object of the present invention to provide a fastening member which may be secured to a first panel and can connect a second panel to the first panel by insertion in a cut-out of the second panel.

It is another object of the present invention to provide a stop for the fastening member.

Another object is to provide a stop which includes one or more apertures disposed in the second panel for receipt of a portion of the fastener member therein.

It is another object of the present invention to provide a stop which includes a plurality of elements on the second panel which retain the compression members of the fastener.

BRIEF DESCRIPTION OF THE DRAWING FIGURES

DETAILED DESCRIPTION OF THE PREFERRED EMBODIMENTS

Figure 1:
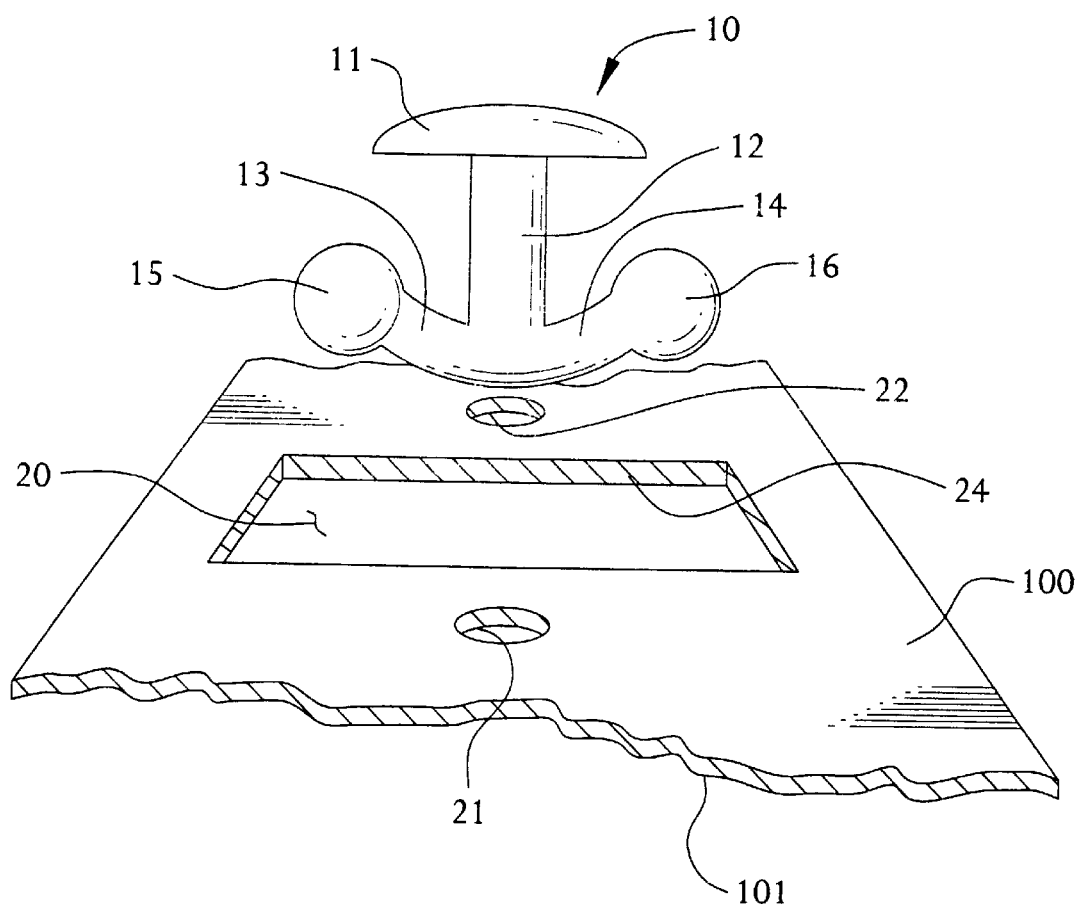
FIG. 1 is a front elevation view of a fastener according to the present invention with a receptacle shown below the fastener.

Referring to FIG. 1, a fastener member 10 according to the present invention is shown. The fastener member 10 is provided with a head 11, a shaft body portion 12, and a pair of arms 13, 14 extending from the shaft body 12. Each arm 13, 14 is provided with retaining means comprising end portions 15 and 16, respectively, disposed on each arm, 13, 14. The shaft body 12 is shown with the head 11 of the member 10 at one end thereof, with the opposite end of the shaft body 12 supporting the arms 13, 14 which extend outwardly therefrom.

The fastener 10 is provided to exhibit a compression fit against a surface with the compression means shown comprising the arms 13 and 14. The arms 13, 14 extend from the shaft body 12 outwardly and preferably upwardly in relation to the fastener head 11. The fastener arms 13, 14 are preferably comprised of a material which is resilient but will also exhibit strength so that the panels can be securely fastened. Such suitable materials comprise plastics, resins, or other pliable like materials.

While not shown, it is understood that the arms 13, 14 can be comprised of a material which may be more resilient than that of the other portions of the fastener member 10. For example, the shaft body 12 of the member 10 can be provided of a hardened material, as can the head 11. In addition, while not shown, the fastener member 10 may be reinforced for heavy duty applications by providing additional strengthening means, which can comprise a steel or wire insert within the member. For example, the shaft body 12, while not shown, may contain a core of wire, as may the arms 13, 14 and the end portions 15 and 16.

In FIG. 1, a second panel 100 is shown for receipt and securing of the fastener member 10 thereto. The second panel 100 is provided with an aperture or cut-out portion 20, and stop means which operates as a stop for the end portions 15 and 16. The stop means is shown comprising stop apertures 21 and 22 disposed on opposite sides of the second panel cut-out portion 20. While not shown, the stop means can also comprise detents or other suitable stopping members, such as raised bosses and the like, on the rear surface 101 of the second panel 100, either in addition to or in place of the stop apertures 21 and 22, for seating the end portions 15, 16 of the fastener. The end portions 15, 16 likewise may be unseated or displaced from the stop means by further rotation of the fastener 10 to move the end portions 15, 16 out of and beyond the stop means. The stop means can also be provided to permit unseating to take place by turning the fastener 10 in the reverse direction relative to the fastening or seating direction.

Figure 2:
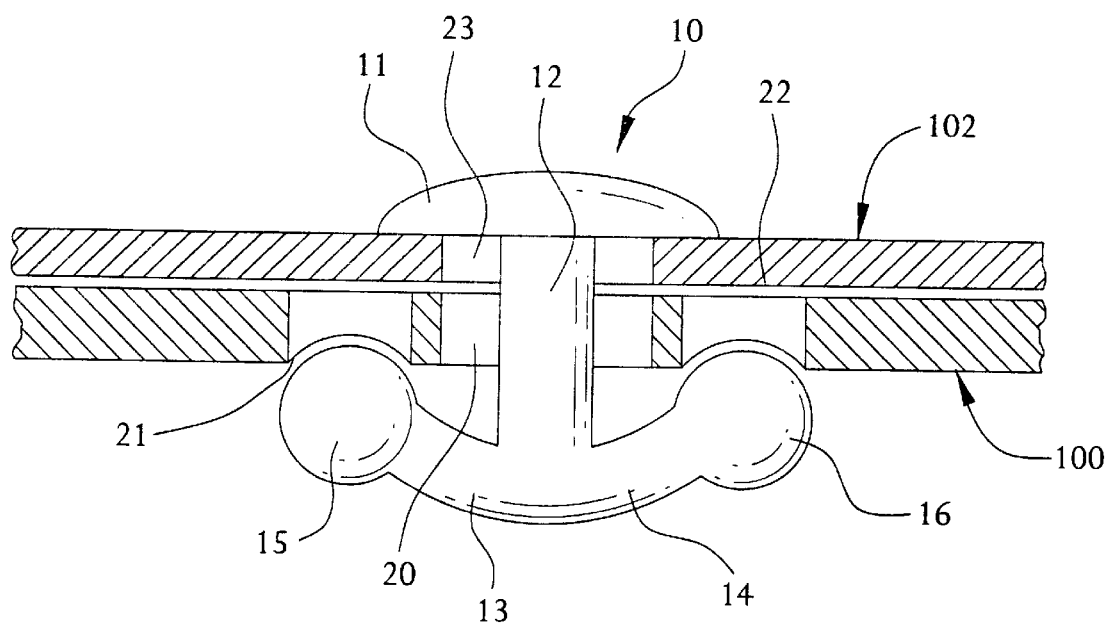
FIG. 2 is a front cross-sectional view of the fastener of FIG. 1 shown in an installation securing two panels together.

Referring to FIG. 2, the fastener 10 of FIG. 1 is shown installed to fasten a first panel 102 to the second panel 100. The end portions 15, 16 of the fastener 10 are shown resting in the stop means apertures, respectively 21, 22. The arms 13, 14 flex away from the shaft body 12 by the force exerted upon them by the first and second panels, respectively 102, and 100. The arms 13, 14 provide a compression force which operates against the first and second panels 102, 100 to compress the panels together and against the fastener head 11.

Preferably, the fastener head 11 is provided of a sufficient dimension relative to the first panel 102 to rest on at least a portion of the first panel 102 which it engages when the fastener 10 is installed. The first panel 102, preferably, is provided having a receiving aperture or cut-out portion therein 23 through which the arms 13 and 14 of the fastener member 10 fit. The receiving aperture 23 of the first panel 102 may be aligned with that aperture or cut-out portion 20 of the second panel 100, or may be perpendicularly provided in relation to the aperture 20 of the second panel 100. The fastener member 10 may be installed to the first panel 102 by insertion into the first panel receiving aperture 23. The first panel receiving aperture 23 can be provided to have a variety of configurations which are suitable to receive the arms 13, 14 of the fastener 10 therein. Likewise, the receiving aperture 23 also is preferably provided to permit the fastener head 11 to be retained by the first panel surface. The receiving aperture 23, for example, may comprise a configuration, having, as its longest dimension, a dimension smaller than the largest cross-sectional width dimension between the arms 13 and 14 and end portion members 15 and 16. In such a configuration, where the first panel aperture 23 is smaller in relation to the arm width of the fastener member 10, the arms 13, 14 must flex for press-fit for installation to the first panel 102, or can be installed one arm at a time. In this manner, the receiving aperture 23 is preferably smaller than the width of the arms 13, 14 to facilitate retention of the fastener head 11 on the first panel 102. This permits the fastener member 10 to remain on the first panel 102 prior to and during installation of a first panel 102 to a second panel 100. It is noted that where a plurality of fastener members 10 are employed, they can be installed onto a first panel such as that 102, and the first panel 102, carrying the fastener members, then attached to a second panel, such as that 100.

Likewise, the second panel aperture 20 may also be provided having a smaller width dimension than that of the fastener member 10 width, as described above, to permit press-fit installation of the fastener 10 into the second panel aperture 20. In that case, press-fit installation of the fastener member 10 and through the receiving aperture 23 in the first panel 102 and subsequently through an aperture 20 in the second panel 100 can provide preliminary attachment of the first panel 102 with the second panel 100 before the fastener 10 is turned to complete installation by moving the end portions 15, 16 into engagement with the stop means.

The fastener 10, once received in the aperture 20 of the second panel 100 is turned to align the end portions 15, 16 into positions within the stop apertures 21, 22. The end portions 15, 16 are preferably provided having a radial or arcuate configuration. This configuration facilitates movement of the arms 13, 14 and end portions 15, 16 across the second panel rear surface 101, as well as over the wall 24 defining the second panel aperture 20 (if the wall 24 is engaged during installation), and within the stop means.

Figure 3:
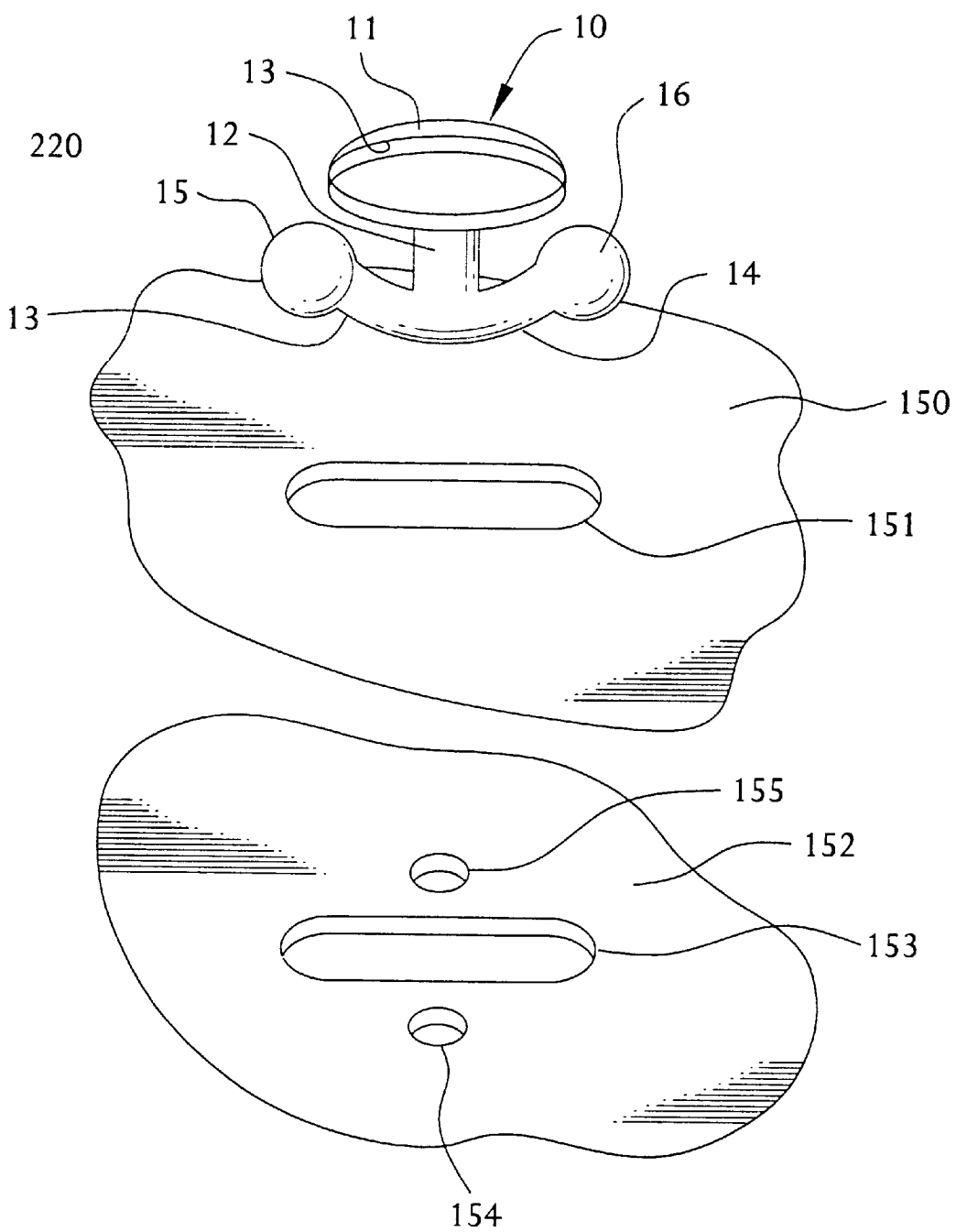
FIG. 3 is a front top perspective view of the fastener of FIG. 1 shown in an alternate installation.

FIG. 3 shows a preferred embodiment of the fastener 10 according to the present invention in an installation where a first member 150 is shown having a prep hole 151 for receipt of the fastener arms 13, 14 which are snapped into the hole 151 of the first member 150. A separate retainer member or element is not required in this installation. A second member 152 is provided for attachment to the first member 150. The second member 152 preferably includes a receptacle, shown comprising a radial slot 153 which is perforated or formed into the second member 152 for receipt of the fastener arms 13, 14. The arms 13, 14 can be pressed into the receptacle 153 for snap or press-fit installation. The second member 152 preferably is provided with a stop, which is shown comprising the apertures 154 and 155.

Figure 4:
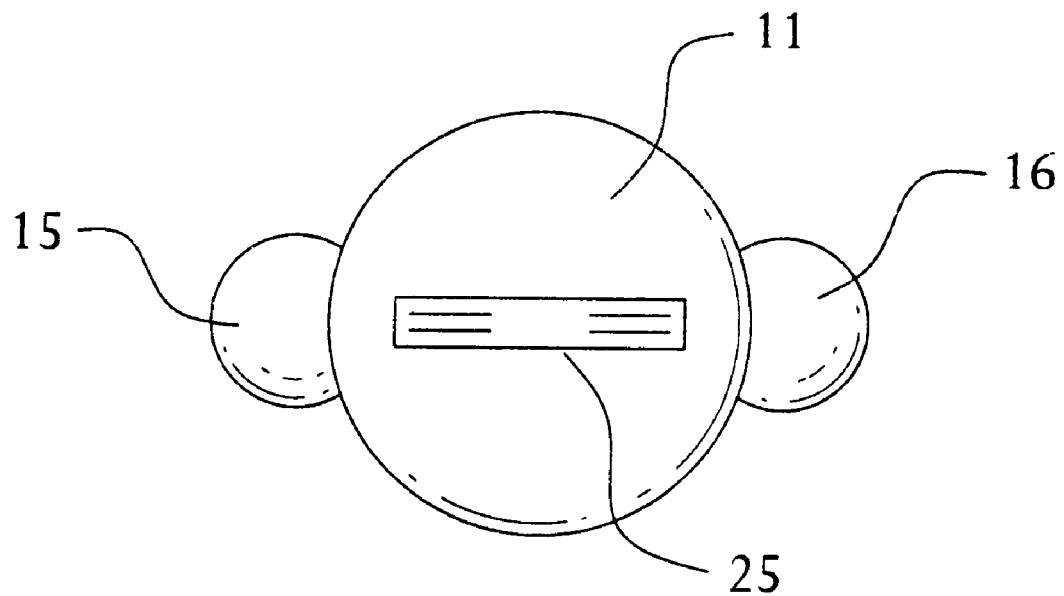
FIG. 4 is a top-plan view of the head of the fastener shown in FIG. 1.

Referring to FIG. 4, the fastener head 11 is shown having rotating means, such as, for example, the screw slot 25. While a screw slot 25 is shown, it is understood that other means such as a Philip's screw head or other head configuration may be employed in a similar manner. A knob may also be provided for turning the fastener 10 without an additional tool.

Figure 5:
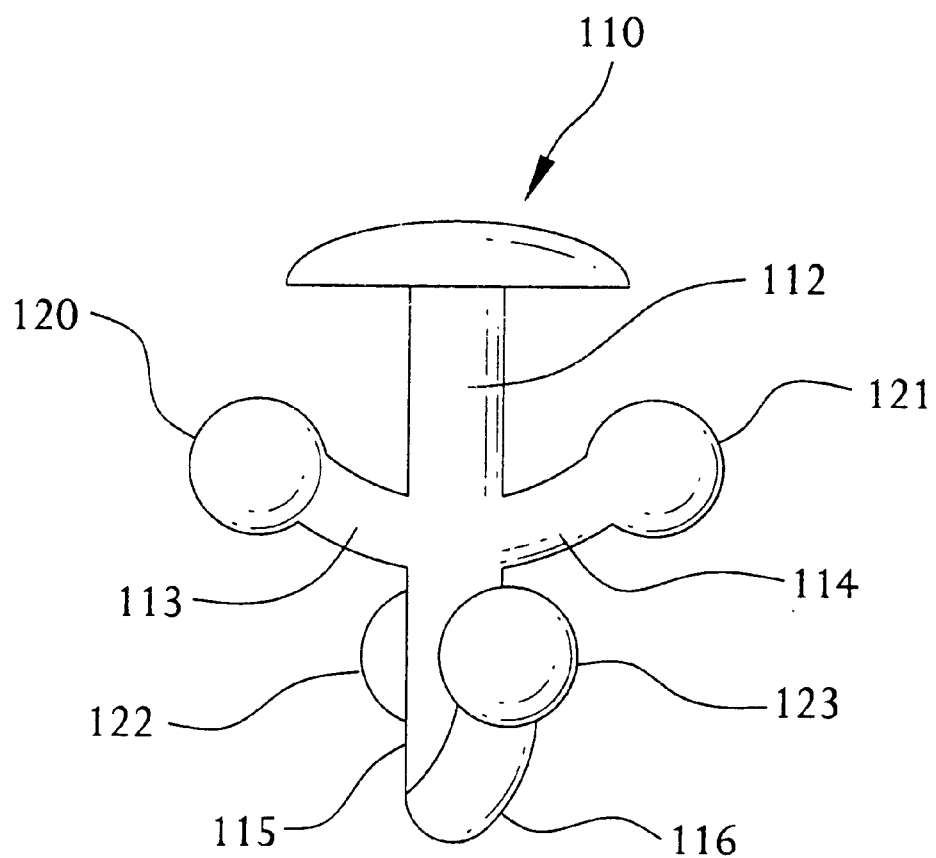
FIG. 5 is a front elevation view of a first alternate embodiment of a fastener according to the present invention.

FIG. 5 shows an alternate embodiment of the present invention in the form of a multi-arm fastener member 110 having multiple arms 113, 114, 115, 116 which extend from a shaft body 112. The arms 113, 114, 115, 116 can be provided similar to those arms 13, 14 described above in relation to the fastener 10 shown in FIGS. 1–3. The multi-arm fastener member 110 shown in FIG. 5 can, as described above in relation to the FIGS. 1–3 fastener embodiment 10, have strengthening means, including a wire member disposed throughout the shaft body 112 and/or arm members 113, 144, 115, 116, in order to provide improved strength. The fastener member 110 can be installed to a first panel by inserting the lower arms 115, 116 through a slot provided in a first panel, and rotating the fastener 110 to insert the upper arms 113, 114 through the same slot. In this manner, the multi-arm fastener 110 can be utilized for securing a plurality of panel members to each other, to a mounting surface, or can secure a plurality of other members together. The arms 113, 114, 115, 116, while shown provided at different heights along the shaft body 112, can be placed in alternate arrangements to accommodate panels of a variety of thicknesses. In addition, the position of the upper arms 113, 114, while shown 90 degrees from the lower arms 115, 116 on the shaft body 112, can be provided at different angles around the shaft body 112 relative to the lower arms 115, 116. Furthermore, while shown symmetrically opposed to one another, the upper arms 113, 114 may be provided at different positions around the circumference, or even at different heights along the vertical axis, of the shaft body 112.

The multi-arm fastener 110 also comprises end portions 120, 121, 122, 123 which function in the manner described above with respect to end portions 15 and 16 of the fastener member 10.

Figure 6:
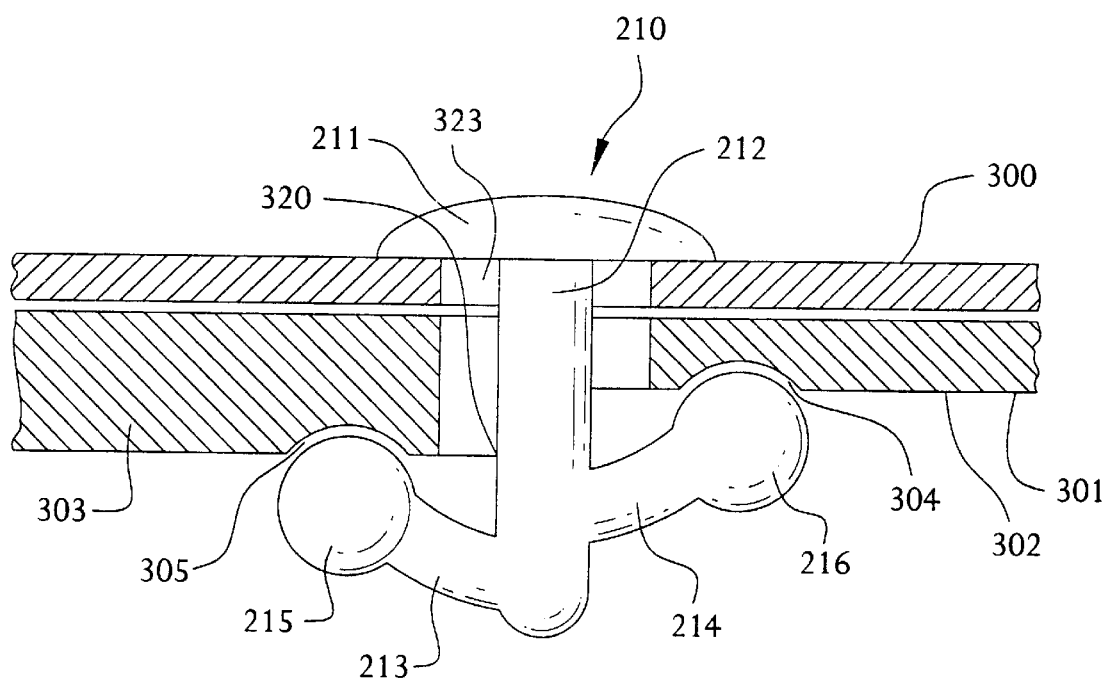
FIG. 6 is cross-sectional view of a second alternate embodiment of a fastener according to the present invention.

Reference is made to FIG. 6, where an alternate embodiment of a fastener member 210 according to the present invention is shown. The fastener 210 is provided with a head 211 and a shaft body 212 extending therefrom with a pair of arms extending outwardly from the shaft body 212. End portions 215 and 216, respectively, are provided on the end of each arm member 213, 214. In the FIG. 6 fastener member embodiment, the arms 213 and 214 are shown provided at different heights along the shaft body 212. The upper arm 214 is shown extending from the shaft body at a point closer to the head 211 of the fastener member 210 than the lower arm 213. The lower arm 213 extends outwardly from the bottom end of the shaft body 212. The offset fastener member 210 is shown in an installation with two panels wherein a first panel 300 of uniform thickness is secured to a second panel 301 having zones of differing thickness throughout. The first panel 300 has a receiving aperture 323 and the second panel 301 is also provided with an aperture 320. As shown in FIG. 6, a thin zone 302 of the second panel 301 is provided along with a thick zone 303. The second panel 301 is provided with stop means comprising a first recess 304 disposed in the thin portion 302 of the panel 301 and a second recess 305 disposed in the thick portion of the second panel 301. The end portions 215, 216 are respectively secured in the first and second recesses 305, 304. In this embodiment, the varied placement of the arms 213, 214 along the shaft body 212, permits panels having different thicknesses, such as that second panel shown as 301, for example, to be fastened with the fastener member 210 according to the present invention.

Figure 7:
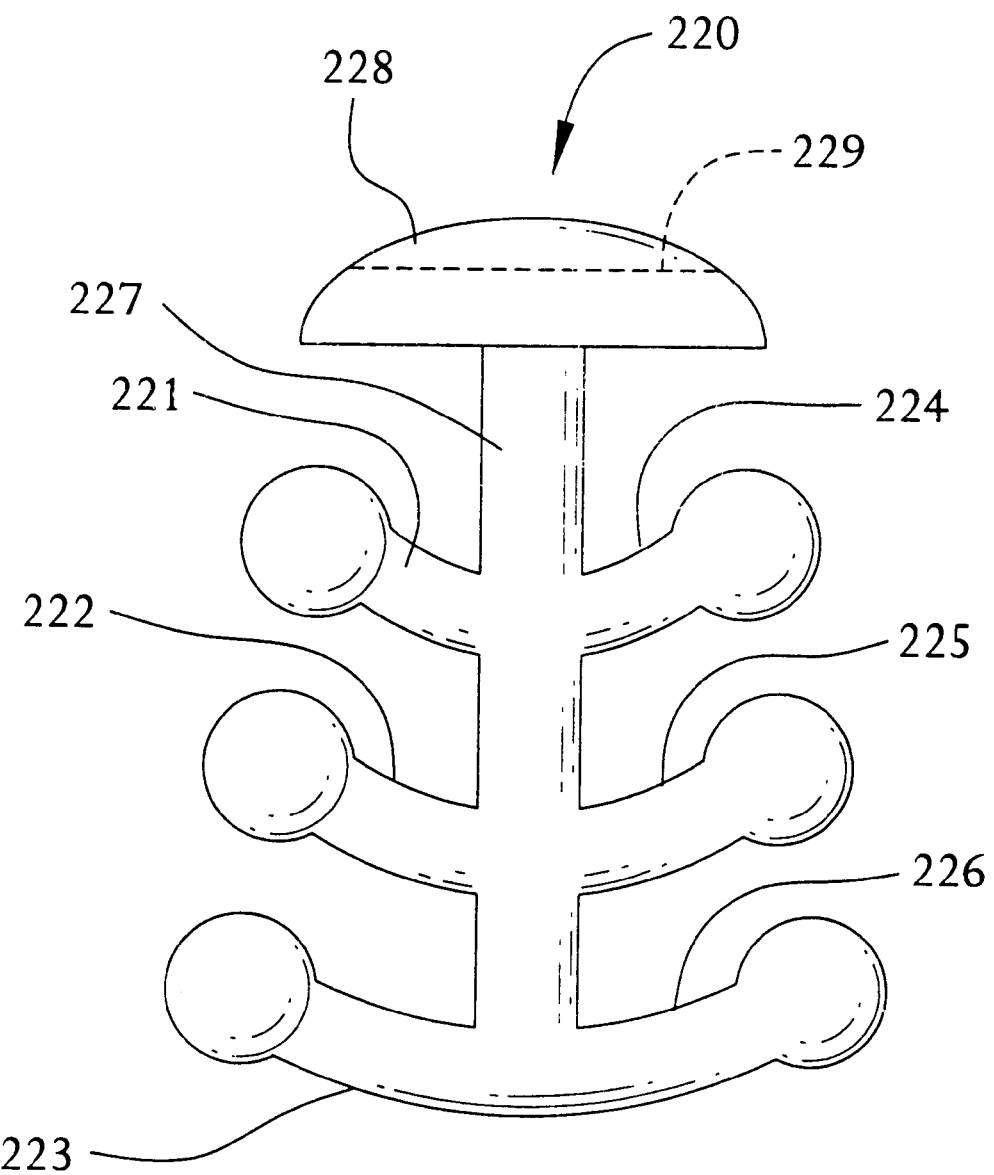
FIG. 7 is a front elevation view of a third alternate embodiment of a fastener according to the present invention.

FIG. 7 shows another alternate embodiment of a fastener 220 according to the present invention. The multi-arm fastener 220 shows a plurality of arms 221, 222, 223, 224, 225 and 226, extending from the fastener body 227. The body 227 has a head 228 with a screw slot 229 at one end thereof and arms 223, 226 extending therefrom at the opposite end.

Figure 8:
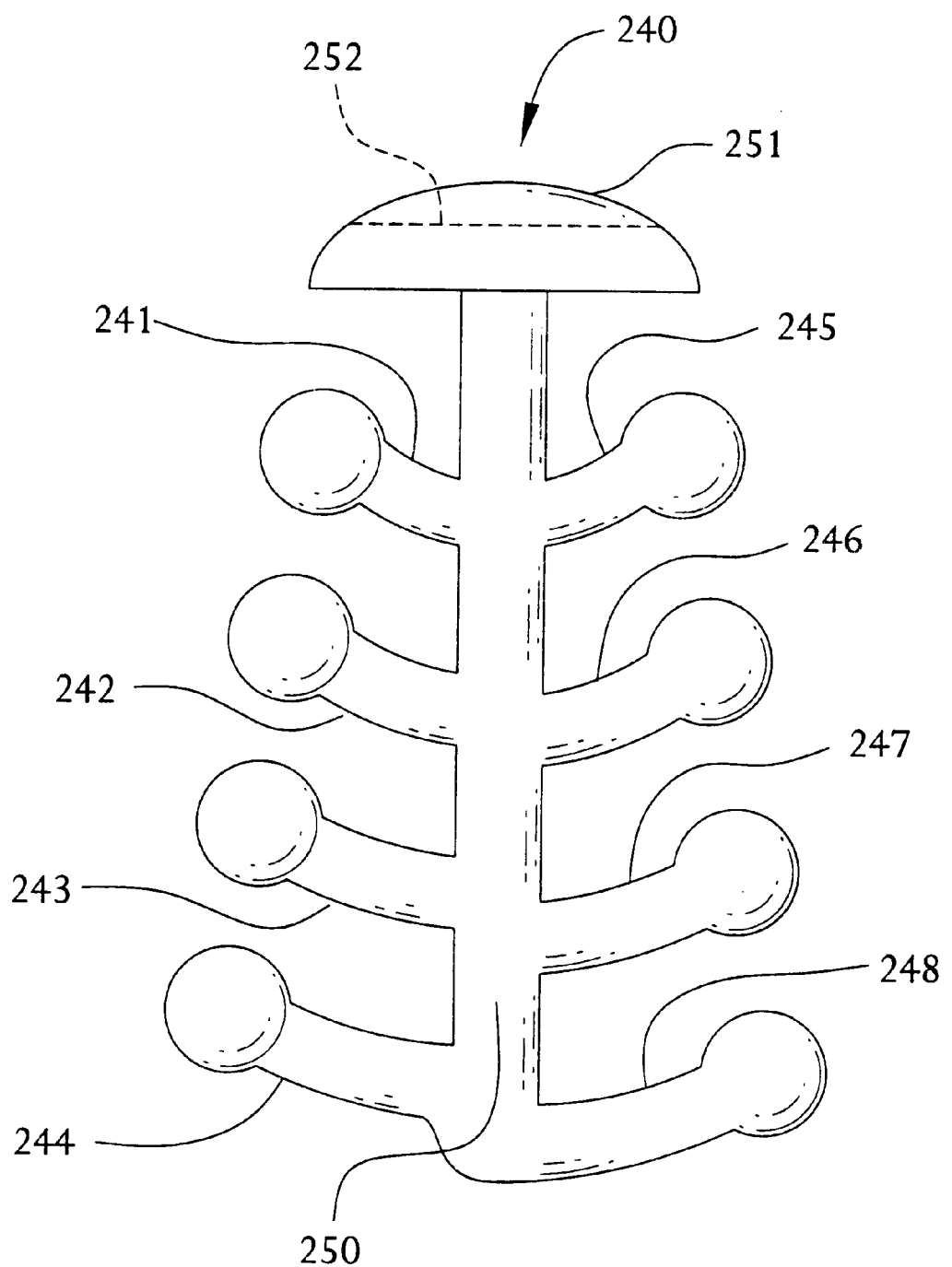
FIG. 8 is a front elevation view of a fourth alternate embodiment according to the present invention.

Another alternate embodiment of a fastener 240 according to the present invention is shown in FIG. 8, wherein a plurality of arms, 241, 242, 243, 244, 245, 246, 247 and 248 are shown in staggered relationship along the shaft body 250 to provide multiple gripping by the arms over the range of the fastener body 250. The fastener 240 has a head 251 with a screw slot 252. In addition to staggering the arms, as shown in FIG. 8, the arms, for example, while not shown, may be provided in a cascading arrangement. Preferably, the alternate embodiments can be press-fit into first and second members as described above in relation to the fastener 10 shown in FIGS. 1–3.

Figure 9:
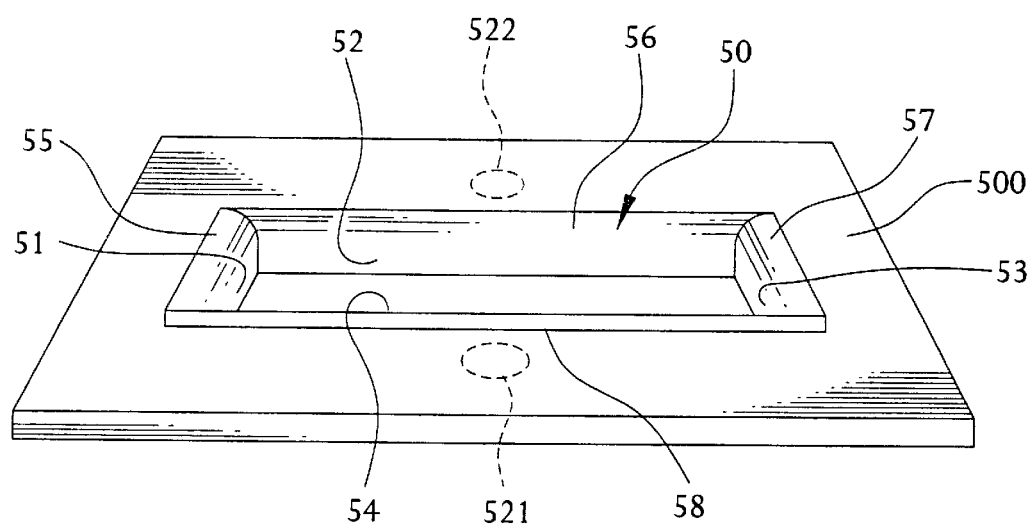
FIG. 9 is front top perspective view of a socket member according to the present invention.

As shown in FIGS. 1, 2 and 3, the aperture or cut-out portion 20 may be cut directly into the panel to which the fastener member 10 is to be installed, or may itself receive an additional socket member 50, as shown in FIG. 9. The socket member 50 is provided as an insert which is received in a panel aperture, such as that second panel aperture 20, shown in FIG. 1. The socket 50 is installed to a second panel, generally 500. The second panel 500 is provided having receiving means, such as the detents or apertures 521, 522, shown in broken-line representation on the second panel 500 and disposed on opposite sides of the socket 50. The socket 50 is shown comprising a rectangular member having four walls 51, 52, 53 and 54 which are vertical in relation to flange portions 55, 56, 57 and 58, respectively, which extend from each wall and rest on the surface of the second panel 500.

It is further understood that while the socket member 50 is shown as a rectangular member, it may be provided in other forms as long as the arms 13, 14 of the fastener member 10, or any fastener embodiment 110, 210, to be used therewith, can fit through the socket. In addition, while not shown, stop means may be provided on the socket member. The socket member 50 can be used where the second panel or member requires reinforcement for retention of the fastener legs.

Other advantages and modifications consistent with the spirit and the scope of the invention may be made. For example, the number and placement of arms on the fastener member shaft body can be varied to suit the thickness of the panel or member being fastened, or the number of panels or members being fastened.

What is claimed is:

1. A fastener member adapted for fastening one or more panel members together, said fastener member comprising:
    a) a head;
    b) a body portion extending from said head; and
    c) compression means disposed on said body portion wherein said compression means is flexibly provided for compression of a panel member adapted to receive the fastener member against the head of said fastener member;
    d) wherein said compression means comprises a plurality of arms extending outwardly from said body portion, with one end of said arm attached to said body portion and the other end of each said arm having a retaining portion, said retaining portion comprising a bulbous portion.

2. The fastener member of claim 1, wherein said retaining portion has a larger cross-sectional diameter than the cross-sectional width of said arm.

3. The fastener member of claim 1, wherein a plurality of said arms are provided extending from said shaft body at different locations along said shaft body.

4. The fastener member of claim 3, wherein said plurality of arms includes at least a pair of oppositely disposed arm members provided on opposite locations on the axis of the body portion.

5. The fastener member of claim 1, wherein said compression means comprises a plurality of arms provided in staggered relation along said body portion.

6. The fastener member of claim 1, wherein said compression means comprises a plurality of arms provided in cascading relation along said body portion.

7. A fastener member for securing a first panel or like object to a second panel or like object, said fastener member comprising:
    a) a body portion having a head at one end thereof which is wider than said body portion and having at the opposite end thereof a pair of arm members extending outwardly therefrom and being disposed on opposite sides of said body portion, wherein said outwardly extending arm members are each turned upwardly in relation to said head portion, and wherein said arm members are resiliently provided, and
    b) wherein said arm members each include a first end which is connected to said body and a second end which has a bulbous portion thereon.

8. The fastener member of claim 7, wherein said arm members comprise spring members.

9. A fastener member for securing a first member to a second member, said fastener member comprising a head, a shaft extending therefrom with a plurality of arms extending outwardly from said shaft, said first member having an aperture therein, said fastener member being adapted to be rotatably carried by said first member such that said head is on one side of said first member and said arms are on the opposite side of said first member, the shaft extending through said first member aperture; said second member being provided having a cut-out portion therein and having disposed on opposite sides of said cut-out portion a retaining recess, wherein the arms of said fastener member are adapted to be received through said cut-out portion; and wherein said arms are attached to the shaft at one end thereof with the other end of each arm member including a retaining portion, wherein said arm retaining portion engages with a said second member retaining recess when the fastener is installed to secure a said first member to a said second member; and wherein said arms are flexibly provided to compress said first and second members together against a counter force provided by the fastener head.

10. The fastener member of claim 9, wherein said plurality of arms comprises a pair of arms disposed on opposite sides of said shaft, extending outwardly from said shaft and upwardly in relation to said fastener head.

11. The fastener mechanism of claim 9, wherein said plurality of arms comprises at least two arms, a first one of which is provided at a location along the shaft closer to the fastener head and the other of which is provided at a location on the fastener shaft further from the fastener head in relation to the first arm.

12. The fastener member of claim 9, wherein said plurality of arms includes a first arm and a second arm, wherein said first arm is provided at a height substantially closer to the fastener head than said second arm.

13. The fastener member of claim 9, further comprising a socket member for installation in the cut-out portion of said second member, said socket finding a space therein for receipt of one or more arms of said fastener member therethrough.

14. The fastener member of claim 13, wherein said socket member comprises a member having at least one wall portion extending through the vertical thickness of the second member and at least one flanged portion disposed in connecting relation to said at least one wall portion and resting on the second member surface.

15. A fastener member adapted for fastening one or more panel members together, said fastener member comprising:

a) a head;

b) a body portion extending from said head; and c) compression means disposed on said body portion wherein said compression means is flexibly provided to compress a panel member against the head of said fastening member;

d) wherein said compression means comprises a plurality of arms extending outwardly from said body portion, with one end of said arm attached to said body portion and the other end of each said arm terminating into a retaining portion, said retaining portion having a larger cross-sectional diameter relative to the cross-sectional width of said arm.

\* \* \* \* \*

UNITED STATES PATENT AND TRADEMARK OFFICE
CERTIFICATE OF CORRECTION

PATENT NO. : 5,897,278
DATED : April 27, 1999
INVENTOR(S) : Albert J. Fratarola

It is certified that error appears in the above-indentified patent and that said Letters Patent is hereby corrected as shown below:

Column 7, line 13, before the first occurrence of "retaining portion" insert --bulbous--;
Column 7, line 13, change "arm" to --bulbous--;
Column 7, line 24, change "mechanism" to --member--;
Column 8, line 27, after the second occurrence of "retaining portion" insert --comprising a bulbous portion--.

Signed and Sealed this

Second Day of November, 1999

Attest:

Q. TODD DICKINSON

*Attesting Officer*          *Acting Commissioner of Patents and Trademarks*